United States Patent [19]
Blosser

[11] Patent Number: 5,941,918
[45] Date of Patent: Aug. 24, 1999

[54] AUTOMOTIVE ON-BOARD MONITORING SYSTEM FOR CATALYTIC CONVERTER EVALUATION

[75] Inventor: Patrick Wayne Blosser, East Windsor, N.J.

[73] Assignee: Engelhard Corporation, Iselin, N.J.

[21] Appl. No.: 08/903,524

[22] Filed: Jul. 30, 1997

[51] Int. Cl.[6] .............................. F01M 3/00; F01N 3/20
[52] U.S. Cl. .......................... 701/29; 701/109; 701/103; 701/102; 60/274; 60/276; 340/439; 73/118.1
[58] Field of Search .................. 701/29, 34, 101, 701/102, 103, 108, 109; 60/274, 276, 277, 285; 73/118.1, 23.2, 23.31, 118.2; 340/439, 633; 123/672, 688, 691, 198 D; 364/150, 151, 528.09; 706/21, 10

[56] References Cited

U.S. PATENT DOCUMENTS

| | | | |
|---|---|---|---|
| 5,177,464 | 1/1993 | Hamburg | 340/439 |
| 5,228,335 | 7/1993 | Clemmens et al. | 73/118.1 |
| 5,237,818 | 8/1993 | Ishii et al. | 60/274 |
| 5,265,416 | 11/1993 | Hamburg et al. | 60/274 |
| 5,265,417 | 11/1993 | Visser et al. | 60/274 |
| 5,363,091 | 11/1994 | Kotwicki et al. | 340/439 |
| 5,408,215 | 4/1995 | Hamburg | 340/439 |
| 5,426,934 | 6/1995 | Hunt | 60/276 |
| 5,431,011 | 7/1995 | Casarella et al. | 60/274 |
| 5,431,042 | 7/1995 | Lambert et al. | 73/116 |
| 5,444,974 | 8/1995 | Beck et al. | 60/274 |
| 5,476,001 | 12/1995 | Hoetzel et al. | 73/23.31 |
| 5,490,064 | 2/1996 | Minowa et al. | 701/1 |
| 5,505,837 | 4/1996 | Friese et al. | 204/425 |
| 5,509,267 | 4/1996 | Theis | 60/274 |
| 5,528,898 | 6/1996 | Nakayama et al. | 60/276 |
| 5,539,638 | 7/1996 | Keeler et al. | 701/29 |
| 5,610,844 | 3/1997 | Maus et al. | 364/528.09 |
| 5,625,750 | 4/1997 | Puskorius et al. | 706/21 |
| 5,819,530 | 10/1998 | Asano et al. | 60/277 |

FOREIGN PATENT DOCUMENTS

| | | | |
|---|---|---|---|
| 756 072 A2 | 1/1997 | European Pat. Off. | F01N 7/00 |
| 196 45 202 A1 | 6/1997 | Germany | F01N 3/20 |

OTHER PUBLICATIONS

SAE Technical Paper Series #920831, "The Relationship Between Catalyst Hydrocarbon Conversion Efficiency and Oxygen Storage Capacity", by Jeffrey S. Hepburn and Haren S. Gandhi, Ford Motor Co., International Congress & Exposition, Detroit Michigan, Feb. 24–28, 1992.

SAE Technical Paper Series #931034, "The Role of Ceria in Automotive Exhaust Catalysis and OBD–11 Catalyst Monitoring", by Galen B. Fisher, General Motors Research and Joseph R. Theis, Mark V. Casarella, and Stephen T. Mahan, AC Rochester, International Congress & Exposition, Detroit Michigan, Mar. 1–5, 1993

XP–002079725, Chapter 3.4, Robert Bosch GmbH, –M. Sideris: "Methods for monitoring and diagnosing the efficiency of Catalytic Converters", May 1998, Elsevier Science B.V. Amsterdam, The Netherlands, pp. 333–334, fig. 150.

Primary Examiner—Jacques H. Louis-Jacques

[57] ABSTRACT

This invention pertains to a vehicular on-board diagnostic emission system in which the system determines whether the vehicle is continuously in compliance with regulatory emission standards by sensing only hydrocarbon and carbon monoxide emissions at a position downstream from the three way catalytic converter. All emission data sensed is correlated to a basic vehicle function, such as speed, and sorted into a number of histograms corresponding to vehicle operating conditions specified by emission regulations. The histograms are sampled in a statistically validated manner to determine if the vehicle complies with emission standards. If a failure has occurred, further histogram diagnostic routines are sequentially implemented to determine which emission system of the vehicle has failed.

26 Claims, 10 Drawing Sheets

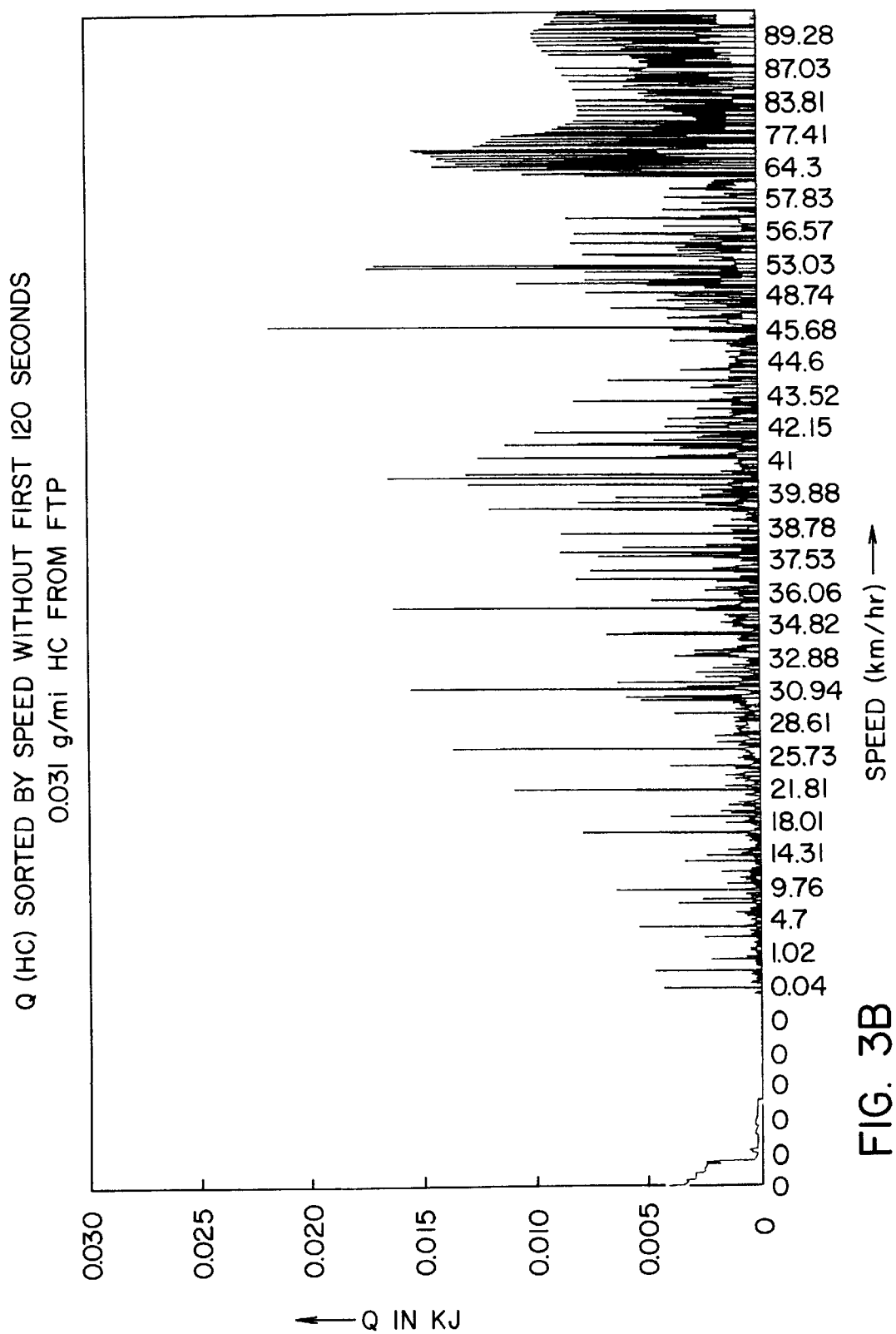

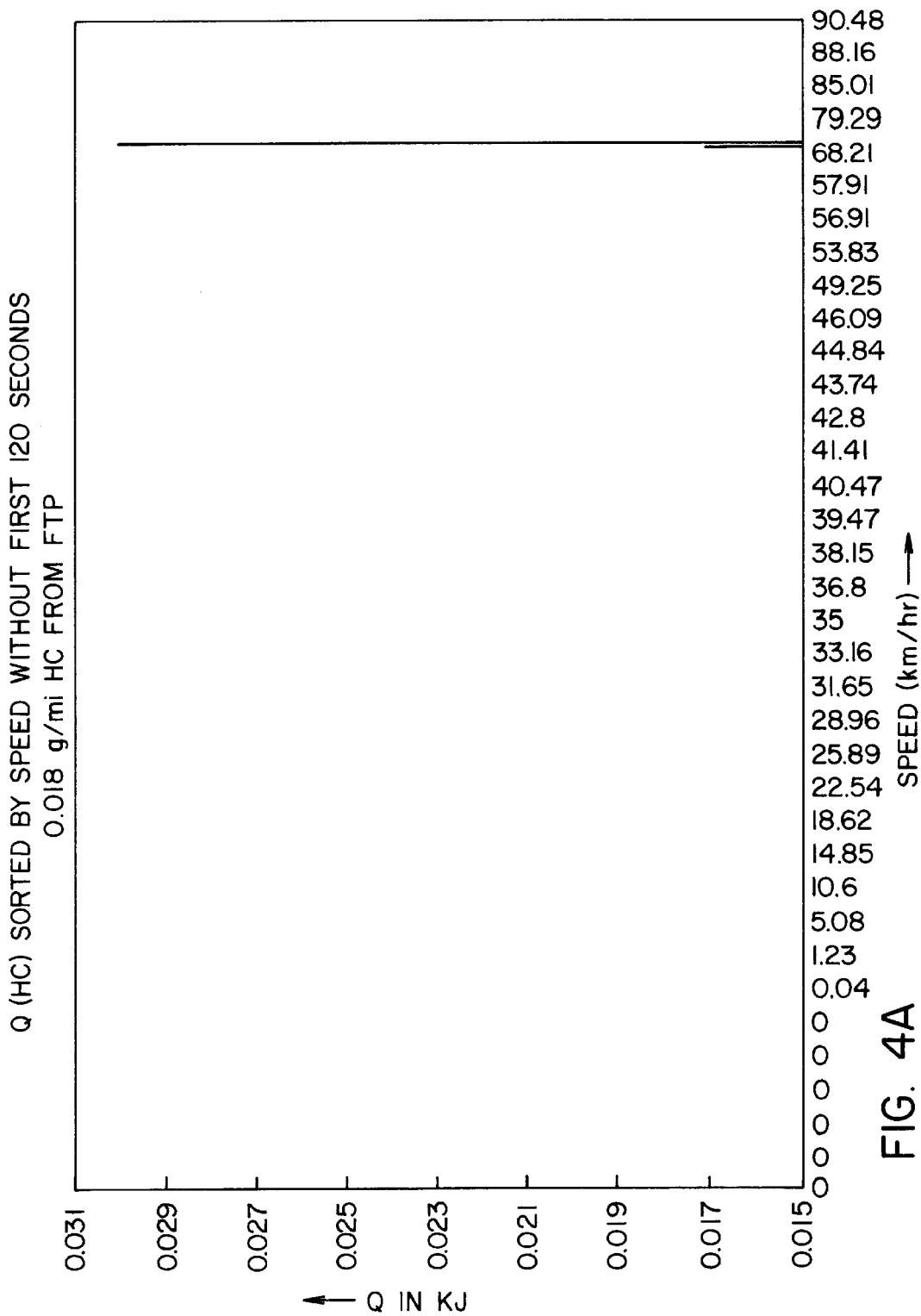

AUTOMOTIVE ON-BOARD MONITORING SYSTEM FOR CATALYTIC CONVERTER EVALUATION

FIELD OF THE INVENTION

This invention relates generally to an onboard system for monitoring vehicular emissions and more particularly to a diagnostic system for monitoring such emissions.

The invention is particularly relevant to an emissions monitoring system in compliance with government regulatory emissions standards such as OBD II mandated by the State of California and will be described with specific reference to such systems. However, those skilled in the art will recognize that the invention may have broader applications and could be used for monitoring, evaluating and/or predicting the functional operation of any number of vehicle components whether or not related to the vehicle's emissions.

INCORPORATION BY REFERENCE

The following United States patents are incorporated by reference herein so that details relating to the engine control module and the ability or sophistication of the engine control module to monitor emissions information need not be set forth nor explained in detail herein. The patents listed below or referenced in the specifications do not form part of the present invention.

A) U.S. Pat. No. 5,431,042 to Lambert et al. entitled "Engine Emissions Analyzer";

B) U.S. Pat. No. 5,426,934 to Hunt et al. entitled "Engine and Emission Monitoring and Control System Utilizing Gas Sensors";

C) U.S. Pat. No. 5,490,064 to Minowa et al. entitled "Control Unit for Vehicle and Total Control System Therefor"; and, D) U.S. Pat. No. 5,237,818 to Ishii et al. entitled "Conversion Efficiency Measuring Apparatus of Catalyst Used for Exhaust Gas Purification of Internal Combustion Engine and the Method of the Same".

E) U.S. Pat. No. 5,505,837 to Friese et al. entitled "Sensor Arrangement for Determining Gas Components and/or Gas Concentrations of Gas Mixtures".

BACKGROUND OF THE INVENTION

As is well known, government regulations require vehicles equipped with internal combustion engines to have emission monitoring systems conventionally known as OBD (On-board Diagnostic Systems) to advise the operator of the vehicle when the gaseous pollutants or emissions produced by such vehicles exceed government regulatory standards. Government regulatory standards set emission threshold levels which the vehicle cannot exceed when operated pursuant to a specified driving cycle such as that set forth in a FTP (Federal Test Procedure). The FTP requires the vehicle be operated at various acceleration/deceleration modes as well as at steady state or constant velocity at various specified speeds.

One of the principal components of the vehicle's emission system is the catalytic converter, typically a TWC (Three Way Catalyst—$NO_x$, hydrocarbons and oxides, i.e., CO). TWCs store oxygen when the engine operates lean and release stored oxygen when the engine operates rich to combust gaseous pollutants such as hydrocarbons or carbon monoxide. As the catalyst ages, its ability to store oxygen diminishes and thus the efficiency of the catalytic converter decreases. Conventional systems in use today monitor the ability of TWCs to store oxygen to determine failure of the catalyst. Typically an EGO (exhaust gas oxygen sensor) is placed upstream of the TWC and an oxygen sensor is placed either within or downstream of the TWC to sense the oxygen content in the exhaust gas. The signals are adjusted for the time it takes the exhaust gas to travel from the precatalytic converter sensor to the postcatalytic converter oxygen sensor. The adjusted signals are then compared to ascertain the storage capacity of the TWC when the engine is in a lean or stoichiometric mode. The principal disadvantage of this method is simply that the oxygen storage capacity of the TWC has been demonstrated to poorly correlate with hydrocarbon conversion efficiencies. See J. S. Hepburn and H. S. Gandhi "The Relationship Between Catalyst Hydrocarbon Conversion Efficiency and Oxygen Storage Capacity", SAE paper 920831, 1992 and G. B. Fischer, J. R. Theis, M. V. Casarella and S. T. Mahan "The Roll of Ceria in Automotive Exhaust Catalysis and OBD-II Catalyst Monitoring", SAE paper 931034, 1993. Another significant disadvantage of current monitoring systems is that for such methods to be applied to low emission vehicles and ultra-low emission vehicles, it will be necessary to monitor increasingly smaller portions of the TWC leading to less reliable correlations to total TWC performance. Finally, any system which attempts to evaluate the efficiency of the catalytic converter by ascertaining the gas composition of an exhaust stream before and after the TWC is inherently flawed because i) the speed of the gas has to be precisely determined even though the gas stream passes through a tortuous path within the converter conducive to producing uneven flow for various gas stream slips and ii) the gaseous reactions within the TWC are fundamentally kinetic in nature and vary in a complex manner depending on the speed and particular composition of the exhaust gas at any given instant.

Today's automotive vehicles are equipped with engine microprocessors or ECMs (engine control modules) that are sophisticated, high powered devices capable of processing input from any number of sensors depicting operating conditions of the vehicle and rapidly issuing engine control signals in response thereto. It is well known to program the ECM to perform on-board monitoring of the emissions system. U.S. Pat. No. 5,490,064 to Minowa illustrates such a control unit which includes in its functions an on-board self diagnostic emissions monitoring process using conventional pre and postcatalytic $O_2$ sensors, digital filtering and exhaust gas speed to correlate the sensor readings to one another to determine failure of the catalytic converter. U.S. Pat. No. 5,431,011 to Casarella et al. likewise illustrates precatalytic and postcatalytic converter $O_2$ sensors whose signals are processed by the CPU in the ECM along with other vehicle operational signals. In Casarella, a two-stage analyzing technique is utilized. Filtered signals are collected in a first stage and analyzed. If the first stage analysis indicates a failure, then a more thorough or rigorous second stage scrutiny of a number of signals which can effect performance of the catalytic converter is conducted before indicating failure of the converter. Despite the sophistication employed in the computer program and the ECM, the aforementioned system is inherently flawed because of the defects in the sampling system discussed above.

Recently, artificial intelligence approaches have been used to avoid reliance on algorithms to calculate the converter activity based upon the laws of physics and/or chemistry. U.S. Pat. Nos. 5,539,638 to Keeler et al. and 5,625,750 to Puskorius et al. illustrate use of sophisticated computerized neural networks utilizing training programs to predict failure of the catalytic converter. In Keeler, the parameters which control the operation of the vehicle's engine such as temperature, back pressure, valve position, etc. are detected by various sensors employed on the vehicle including the conventional EGO sensor upstream of the catalytic converter and are trained in the sense that the operating conditions vis-a-vis the vehicles ECM are correlated to an emissions level produced by the vehicle's engine for the sensed operating conditions of the engine. The signals are stored on a time basis and factored and compared to a threshold value indicative of a regulatory standard at which an emissions failure is deemed to have occurred. In Keeler, training of the neural network is accomplished by simply inserting whatever sensor probe is used by the government regulatory agency in the vehicle's exhaust pipe to generate emissions data correlated to the sensed parameter. Puskorius discloses a more sophisticated neural network and additionally uses an EGO sensor position rearwardly of the catalytic converter to provide two neural artificial intelligence networks with feedback. One network establishes emissions before the catalytic converter and the second network establishes emissions after the catalytic converter. Training data for the networks is provided from a data bank of a large number of similar vehicles with data accumulated over the expected vehicle life. In operation, then, a trained neural network provides an efficiency ratio accumulated over time which is compared against stored data to predict when failure of the catalytic converter will occur. While an artificial intelligence computerized network may appear theoretically sound, in practice, it is only as good as the training data which cannot be precisely correlated to that one specific vehicle which is being sampled. The assumption is made that any specific vehicle will produce emissions at the level of that produced by the vehicle(s) from which the training data was assimilated.

The prior art has also recognized that sensors other than oxygen sensors can be employed to measure gaseous pollutants in the exhaust stream of an internal combustion engine. U.S. Pat. Nos. 5,451,371 to Zanini-Fisher et al. and 5,265,417 to Visser et al. illustrate hydrocarbon sensors of the calorimeter and micro-calorimeter type which are somewhat similar to pellistor sensors and which have been specifically developed for monitoring hydrocarbon emissions. In U.S. Pat. No. 5,476,001 to Hoetzel et al., an exhaust gas sensor is disclosed which is capable of determining pollutant components independently of the oxygen partial pressure of the exhaust gas. Still another type of sensor is shown in U.S. Pat. No. 5,610,844 to Maus et al. which illustrates use of temperature differentials, from temperature measurements within the catalytic converter, to determine the exhaust gas composition. It is well known however that sensor life directly corresponds to the temperature of the exhaust gases. Placing sensors within the catalytic converter invariably leads to short life expectancy of the sensors.

U.S. Pat. Nos. 5,177,464 to Hamburg, 5,265,417 to Visser et al. and 5,408,215 to Hamburg, all disclose the use of a hydrocarbon sensor to determine the efficiency of the TWC by sequentially tapping portions of the exhaust gas stream, upstream and downstream of the TWC, and comparing the ratios of sensed hydrocarbons to determine an efficiency ratio which in turn is stored in a register and sampled or averaged and compared against threshold values to determine or predict catalytic failure. This prior art, which discloses the use of hydrocarbon sensors (and NOx sensors) instead of EGO sensor, is similar to conventional systems and methods described above which monitor the efficiency of the catalytic converter by precatalytic and post catalytic converter measurements so that when the catalytic converter ages and its efficiency diminishes, the operator can be warned that the emission system of the vehicle has, or will shortly fail and the vehicle must be serviced. It should be recognized that the prior art systems discussed above do not really care what emissions are produced by the vehicle. So long as the upstream and downstream measurements can record catalytic activity in a consistent manner, efficiency ratios can be promulgated and arbitrarily assigned a pass fail ratio. When the efficiency ratio reaches a preset value, it is expected that the vehicle will fail the FTP. It should also be noted that the prior art approach caters to OBD regulations in that the monitoring system is to indicate what part of the emissions control systems on the vehicle has failed.

U.S. Pat. No. 5,444,974 to Beck et al. and the FIG. 6 embodiment of the Hamburg references disclose a fundamentally different approach than that discussed above. In Beck, an especially developed calorimetric sensor is used downstream of the TWC to sense hydrocarbon emissions of the vehicle. Tests established that the especially developed calorimetric sensor correlates to emissions when the vehicle is operated at certain conditions, including constant speed and at stoichiometric or lean engine conditions. Beck thus filters the signals developed by his calorimetric sensor so that only the signals developed when the vehicle is at specified operating conditions are collected. Thus, an EGO sensor upstream of the TWC is used to accept/reject signals for storage. The stored signals are then built into a histogram which is compared to a threshold histogram for activating the vehicle's fault indicating light. The FTP, however, requires the vehicle to meet varying speed requirements irrespective of whether certain emissions of the vehicle satisfy preset conditions. In Hamburg's alternative embodiment, the HC sensor simply senses the post catalyst exhaust stream content and compares the sensed value to a stored reference value for that engine speed and load. This concept is fundamentally sound and the present invention may be viewed as an extension or further refinement thereof. In the alternative embodiment of Hamburg there is no attempt to ascertain where the failure in the vehicle's emission system occurred nor is there any attempt to correlate the readings to duplicate an FTP.

BRIEF DESCRIPTION OF THE INVENTION

Accordingly, it is a principal object of the present invention to use actual emission data stored and sampled in appropriate histograms to replicate FTPs and thus determine actual failure of the vehicle to meet regulatory emission standards.

This object along with other features of the invention is achieved in an on-board vehicular catalytic converter monitoring system (method and/or apparatus) for determining failure of a vehicle to meet emission regulatory standards which system includes an emission sensor down stream of the catalytic converter generating signals during vehicle operation indicative of the gaseous pollutants produced by the vehicle's internal combustion engine and at least one operative sensor on the vehicle generating signals indicative of an operating condition experienced by the vehicle, i.e., speed. The vehicle's electronic control module simultaneously processes the emission signals and the operative signals to determine when and if the emission signals have exceeded regulatory standards. This is accomplished by matching each emission signal with an operative signal, storing each emission signal in a multi-channel analyzer or memory to build histograms of emission signals for various ranges of an operating condition sensed by the operative sensor. The ECM samples each histogram after a sufficient number of events have been stored to determine a factored emission state of the vehicle at a given vehicle operating condition which, importantly, is indicative of the actual pollutants emitted by the vehicle which, in turn, is compared to a stored threshold emission level corresponding to a regulatory emission standard for the given vehicle operating condition set by the FTP. When a preset number of sampled histograms have exceeded stored threshold levels, a fault indicating mechanism is triggered alerting the operator to a failure of the vehicle's emission control system. Failure is thus indicated by a system which actually measures the pollutants produced by the specific vehicle as if the vehicle were actually undergoing an emissions test by the governmental regulatory agency.

In accordance with another important feature of the invention, the system includes a plurality of second operative sensors, each second operative sensor generating operating signals during vehicle operation indicative of an operating condition of the vehicle's internal combustion engine producing gaseous pollutants, and the ECM's memory banks include a programmable routine to associate any given plurality of operative signals with a simultaneously generated emission signal whereby the multi-channel analyzer or memory contains emission signals correlated to various operative sensor signals. When the fault indicating mechanism has been activated, the ECM sampling mechanism includes a sort routine which determines by histogram construction from selected operative signals whether or not a given component of the emissions system has malfunctioned. The system thus quickly responds to initially determine and, if necessary, indicate a failure which failure is subsequently pinpointed by performing additional routines with the identified failure stored in a memory code of the vehicle for access when the vehicle is serviced.

In accordance with another more specific feature of the invention, a number of conventional type processing techniques can be utilized to construct a set number of histograms to store a sufficiently large database of actually observed emissions to i) replicate FTPs and ii) be statistically sampled in a valid manner to factor inconsistencies attributed to system and sensor variations. Accordingly, sensor readings are digitized, time stamped and sorted into histograms indicative of acceleration, deceleration and steady state speed conditions required under FTPs which are sampled in a statistically valid manner to produce a monitoring system that constantly insures that any specific vehicle is consistently or constantly in compliance with emissions regulatory standards promulgated by any governmental agency.

It is thus a principal object of the present invention to provide a vehicle on-board emissions monitoring system which utilizes actual emission data produced by the specific monitored vehicle to construct relatively large data bases coinciding with government mandated FTPs which can be statistically validated to insure accurate and reliable compliance with vehicular emission standards.

It is an object of the invention to provide an accurate vehicular on-board automotive emission monitoring system which produces consistent, reliable readings indicative of the gaseous pollutants actually emitted by the vehicle.

Yet another object of the invention is to provide an automotive on-board emission monitoring system which can be varied to determine compliance with any emission test protocol and which can automatically adjust for aging of the catalytic converter.

Another important object of the invention is to provide an on-board vehicular emission monitoring system which is simple and inexpensive.

Another object of the invention is to provide a vehicular emission monitoring system which utilizes the vehicle's existing ECM to monitor the emissions produced by the vehicle.

Still another object of the invention is to provide an on-board vehicular emission monitoring system which is predictive of an expected failure of the vehicle's emission system so that the vehicle can be scheduled for preventive maintenance.

Still another object of the invention is to provide an on-board emission diagnostics system which after determining that a failure of the emissions system by a relatively fast processing routine then proceeds to execute further processing routine to pinpoint the components in the system which caused the failure.

Still another object of the invention is to provide an on-board, vehicular emission diagnostic system which uses only one emission sensor to determine if the vehicle complies with regulations and in the event of failure uses existing sensors on the vehicle to determine where the failure occurred.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and an arrangement of certain parts taken together and in conjunction with the attached drawings which form part of the invention and wherein:

FIG. 3B is an extrapolated graph of hydrocarbon emissions for an FTP run on a catalytic converter aged at 50,000 miles;

FIG. 4A is the graph of FIG. 3A replotted to exclude emission data below a fixed level;

DETAILED DESCRIPTION

Figure 1:
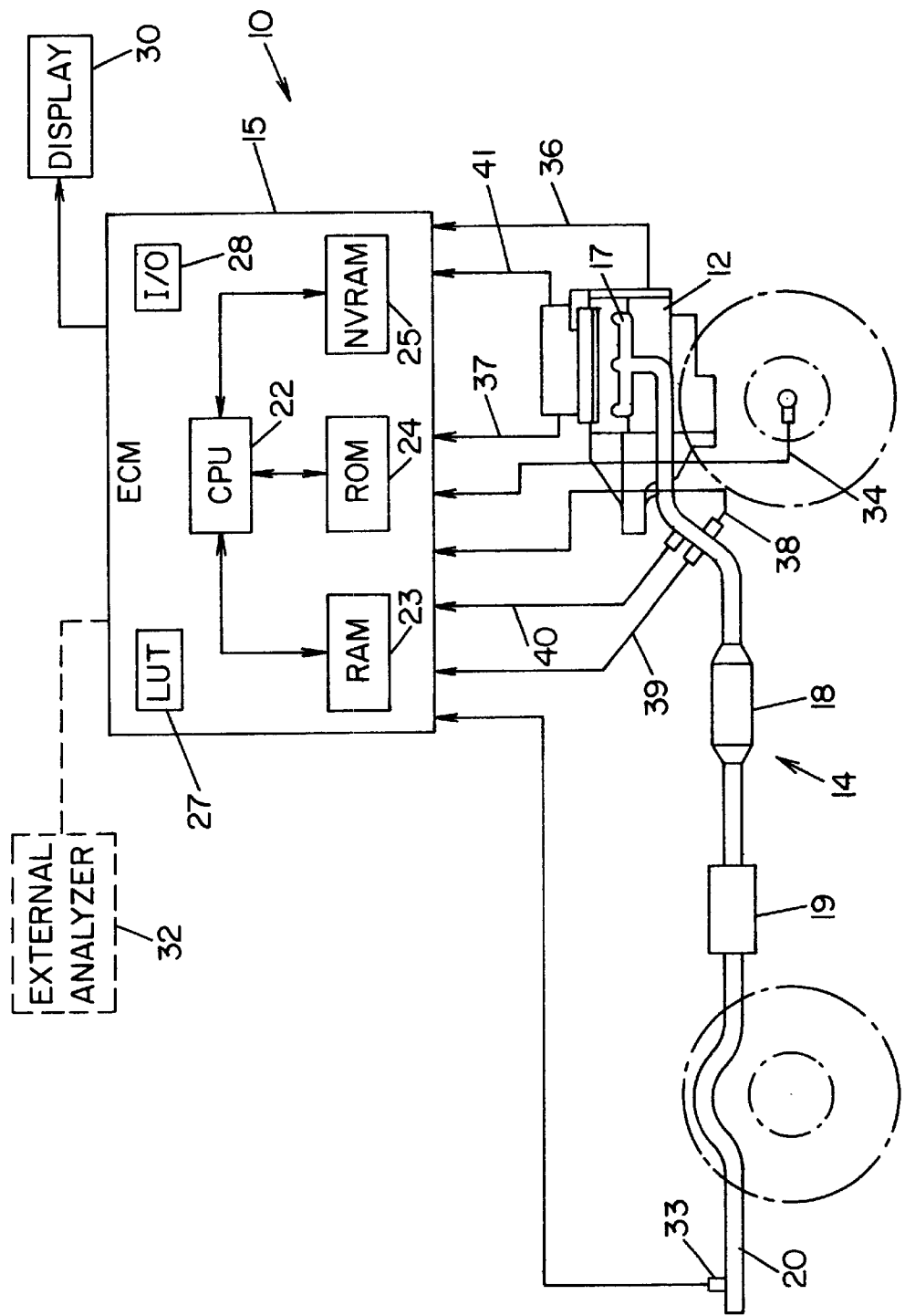
FIG. 1 is a general diagrammatic illustration of the vehicular components of an emission system.

Referring now to the drawings wherein the showings are for the purpose of illustrating a preferred embodiment invention only and not for the purpose of limiting same, there is generally shown in diagrammatic form in FIG. 1 the principal components of a vehicular emission control system 10. The vehicle has an internal combustion engine 12 which discharges gaseous pollutants or emissions through an exhaust system 14. Internal combustion engine 12 is conventionally under the control of an electronic control module or ECM 15 (controller or computer).

Exhaust system 14 is conventional and includes an exhaust header 17, a three-way catalyst or TWC 18 positioned downstream of exhaust header 17, a muffler 19 downstream of TWC 18 and a tailpipe 20 downstream of muffler 19 which is open to atmosphere for discharging or emitting the emissions or gaseous pollutants produced by internal combustion engine 12.

ECM 15 is conventional and includes well known elements such as a central processing unit or CPU 22, RAM (Random Access Memory) 23, ROM (Read Only Memory) 24, and NVRAM (Non Volatile Random Access Memory) 25. Also included is a look-up table 27 separate and apart from ROM 24 (or alternatively included as a component of ROM 24). Also shown is a conventional input/output unit (I/O) unit 28 for receiving and transmitting appropriate instructions from and to ECM 15. Insofar as the present invention is concerned, I/O unit 28 will transmit appropriate instructions to activate a display failure light 30 situated in the vehicle. I/O unit 28 may also interface with an external analyzer 32 which could be optionally supplied if analog circuitry were optionally provided to process the emission signals. Communication between ECM 15 and actuation units on the vehicle including sensors associated therewith is typically carried out via conventional two-way communication links which may be, for example, bi-directional serial data links in 8-bit, 16-bit or 24-bit formats. ECM 15 operates in a well established known manner to control the engine and process engine control and diagnostic routines, such as stored by step by step instructions in ROM 24. Essentially, engine operating parameters are read into ECM as input signals which are then processed into output signals or control signals outputted from ECM to actuation units on the vehicle controlling the vehicular operation, specifically, the operation of internal combustion engine 12. Insofar as the present invention is concerned, input sensor signals are read into ECM, processed by RAM 23 and NVRAM 25 under the control of CPU 22 from algorithm routines stored in ROM 24. Processed data is stored in memory (multi-channel analyzers within ROM 24 and data in LUT 27) which is then accessed by RAM 23 and NVRAM 25 through algorithms stored in ROM under the control of CPU 22 to generate signals outputted by I/O unit 28 to display 30.

Several sensors normally applied to the vehicle with their sensor signals inputted to ECM 15 are shown in FIG. 1. The only sensor added to the vehicle so that the vehicle meets OBD and OBD-II regulations is an emission sensor generating emission sensor signals on line 33. Typical sensors which generate operative signals indicative of an operating condition of the vehicle include a vehicle speed sensor generating vehicle speed signals on line 34; an RPM sensor generating signals on line 36 indicative of the RPMs of engine 12; an A/F sensor generating signals on line 37 indicative of the ratio of air to fuel fed to engine 12 controlling combustion at stoichiometric ranges in engine 12; an EGO sensor generating signals on line 38 indicative of the oxygen present in the exhaust gas upstream of TWC 18 for controlling the exhaust gas recirculation (EGR) system on the vehicle; a temperature sensor generating signals on line 39 indicative of the temperature of the exhaust gas; a gas flow sensor generating signals on line 40 indicative of the speed of the exhaust gas; and a "miscellaneous" sensor generating signals on line 41 indicative of any other sensor signals used to control ignition timing, fuel injection, etc. of engine 12. In accordance with one aspect of the invention, only vehicle speed sensor signal 34 and hydrocarbon sensor signal 33 are used to determine a failure in the vehicle's emission system. However, other sensor signals indicative of vehicle speed such as the RPM sensor signals 36 and load signals can be used along with vehicle speed sensor signals 34 in a more sophisticated version of the invention.

Also, in accordance with the broad concepts of the invention, any type of sensor can be used for hydrocarbon sensor 33. However, it is a specific aspect of the invention that a hydrocarbon sensor is used for hydrocarbon sensor 33 and in still a more specific aspect of the invention, hydrocarbon sensor 33 is preferably of the calorimetric or pellistor type. As is well known, calorimetric or pellistor sensors conventionally comprise two sensors. One of the sensors is coated with a catalyst and the other sensor may be plain. The catalyst coated sensor speeds the reaction of hydrocarbons, carbon monoxide and air in the exhaust gas traveling over the catalyst coated sensor causing a temperature increase in that sensor. The temperature increase in the catalyzed sensor compared to the plain sensor thus provides a signal differentiation which is an indication of the emissions produced by engine 12. Other variations of calorimetric sensors use more than two sensor strips and signal measurements are not necessarily indicative of temperature variations between the strips but nevertheless permit through comparison of measurements produced by the sensor strips the composition of the exhaust gas to be ascertained including $NO_x$. All such variations of a calorimetric or pellistor sensor are intended to be included within the definition of hydrocarbon sensor 33. Referring still to FIG. 1, hydrocarbon sensor 33 is shown positioned as far removed from and downstream of TWC 18 as possible to illustrate the fact that the consistency and reliability of calorimetric sensor readings(as well as sensor life) are improved if the exhaust gas temperature is reduced from that temperature the exhaust gas has when it immediately exits TWC 18. While the tailpipe position is theoretically preferred, as a practical matter, it is not desirable to place hydrocarbon sensor 33 in tail pipe 20. In accordance with the preferred practical embodiment of the invention, hydrocarbon sensor 33 is placed in its practical and conventional position (not shown) which is adjacent the exit end of TWC 18 and specifically the tubular exhaust end of the catalytic converter casing.

Figure 3A:
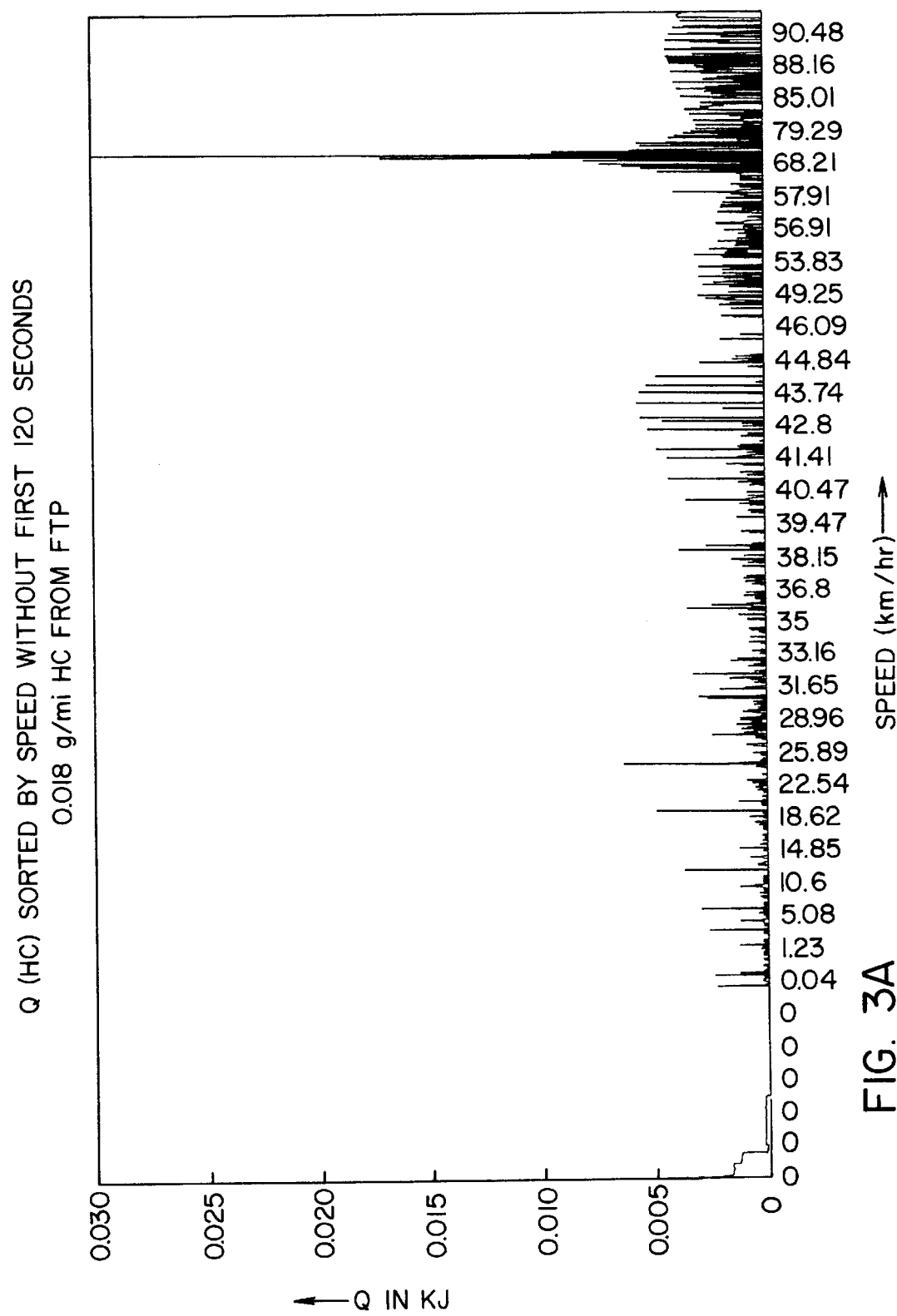
FIG. 3A is an extrapolated graph of hydrocarbon emissions for an FTP run on a new catalyst.
Figure 3C:
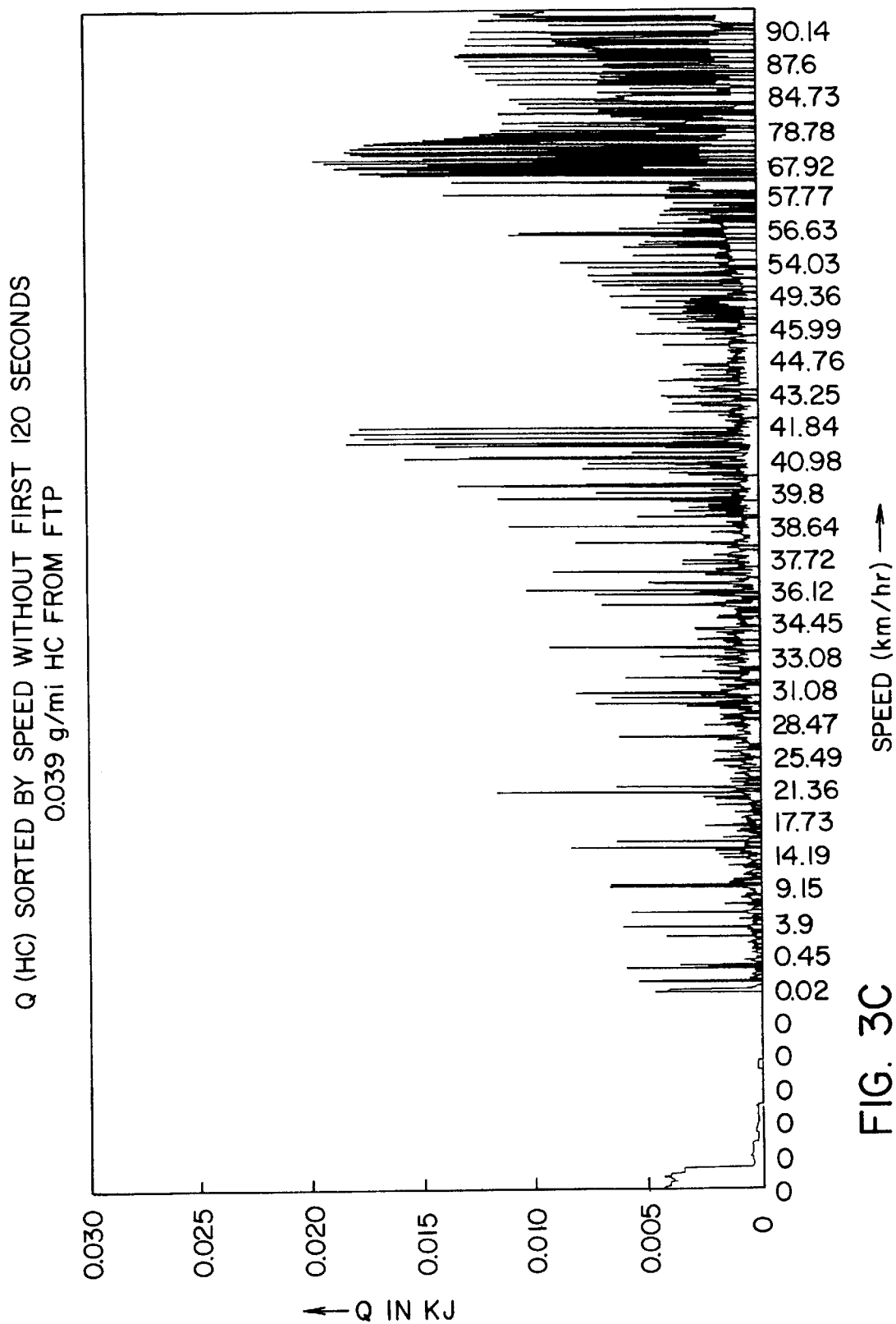
FIG. 3C is an extrapolated graph of hydrocarbon emissions emitted during an FTP run with a catalytic converter aged at 100,000 miles.

The validity of using hydrocarbon sensor 33 as the instrument for determining emissions produced by the vehicle is demonstrated in FIGS. 3A, 3B, and 3C and FIGS. 4A, 4B, and 4C (corresponding FIGS. 3A, 3B, 3C respectively). More specifically, second-by-second FTP (Federal Test Procedure) data was collected on emissions from a 1995 Honda Accord vehicle equipped with a 2.2 L, 4 cylinder EFI engine and automatic transmission. The FTP driving cycle run number along with catalyst aging and GHC/mile emissions for the runs that were used are identified in the table below.

TABLE

FTP data used for demonstration of algorithm

| FTP Cycle Run # | gHC/mile for Run | Catalyst aging | Corresponding Figures |
| --- | --- | --- | --- |
| A | 0.018 | fresh | 3A, 4A |
| B | 0.031 | 50 hours | 3B, 4B |
| C | 0.039 | 100 hours | 3C, 4C |

FIGS. 3A, 3B, 3C and 4A, 4B, 4C are plots showing Q (HC) (heat corresponding to temperature correlated to HC plotted on y-axis) Vs vehicle speed (plotted on x-axis) for the FTP cycle runs above, where Q (HC) is the heat release (in KJ) that would result from full combustion of the hydrocarbons emitted for a particular second during the run. Also, the FTP runs were taken only after the engine had operated beyond 120 seconds after engine "cold start" so that faulty emission data would not appear in the collected data. The grams of HC emitted at a particular second is calculated from:

gHC=[HC concentration (in ppm) * 0.000001 * 3 * 576.8 g HC/m$^3$ * tailpipe vol. flow rate (in m$^3$/sec)]

where: HC concentration is given on a $C_3$ basis, 3 adjusts this to a $C_1$ basis, and 576.8 g/m$^3$ is the gas density used for hydrocarbons The heat release [Q (HC) in KJ] at a particular second is then calculated from grams of HC and a heat release of 661 KJ/mol HC according to the following:

$$Q(HC) = \frac{g\,HC * 661\,KJ/mole}{13\,g\,HC/mole\,HC}$$

The calculated values for Q (HC) will directly correlate to signals which can be obtained from a pellistor type hydrocarbon sensor. Although the actual values plotted on the y-axes of FIGS. 3A–3C, 4A–4C will not exactly replicate sensor signals, they are sufficient to prove out this concept for signal processing. Finally, the Q (HC) values were sorted by speed and plotted as shown in FIGS. 3A–3C, 4A–4C.

As set forth in the table, FIGS. 3A, 3B, 3C are plots comparing the three FTP runs with emissions as specified in the table. These three FTP runs were selected because they allow comparison of the same catalyst aged for different periods of time. As the catalyst is aged, its TWC performance becomes slowly worse. This is readily apparent when comparing FIG. 3A with either FIG. 3B or FIG. 3C, but less apparent when comparing FIGS. 3B and 3C.

The differences between FIGS. 3B and 3C become much more apparent when one only considers signals that exceed a given threshold level. To demonstrate the point, an arbitrary threshold value of 0.015 KJ has been used and FIGS. 3A, 3B and 3C have been replotted as FIGS. 4A, 4B and 4C, respectively. Comparison of FIGS. 4A, 4B, 4C allows easy differentiation of catalyst performance.

Assuming that catalyst failure correlates to emissions above 0.035 g/mile for the FTP cycle, one can use this arbitrary threshold value and a cell defined as all data between 60 and 75 km/hr to diagnose catalyst failure. For example, failure can be defined by a percentage of signals in this cell that exceeds 25% of the established FTP limit for the cell, i.e., 0.035 g/mile.

$$\left( \frac{\text{emissions} \geq \text{threshold}}{\text{total emission}} \geq 0.25 \right)$$

Figure 4B:
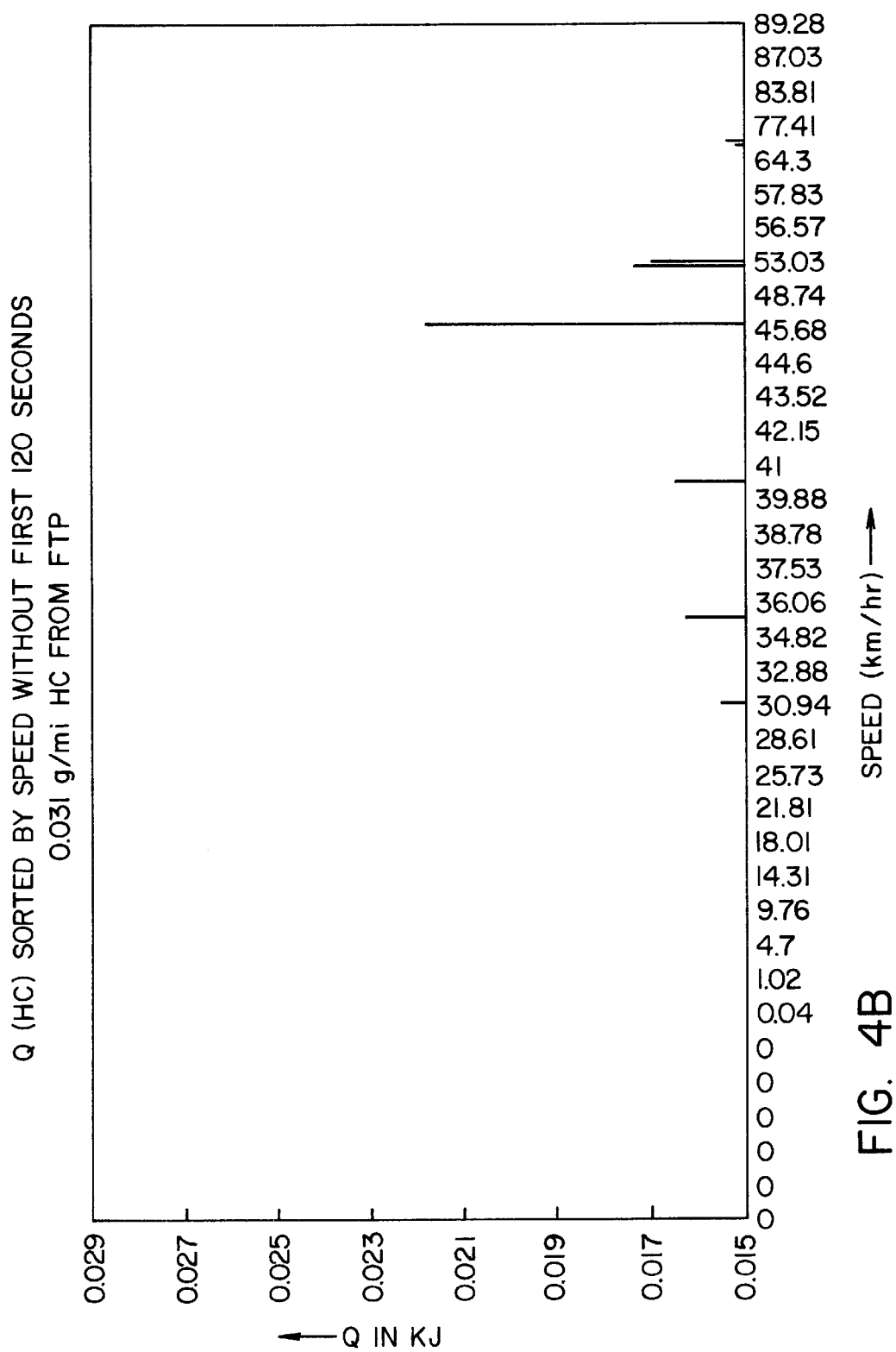
FIG. 4B is the graph of FIG. 3D replotted to exclude emission data below a fixed level.
Figure 4C:
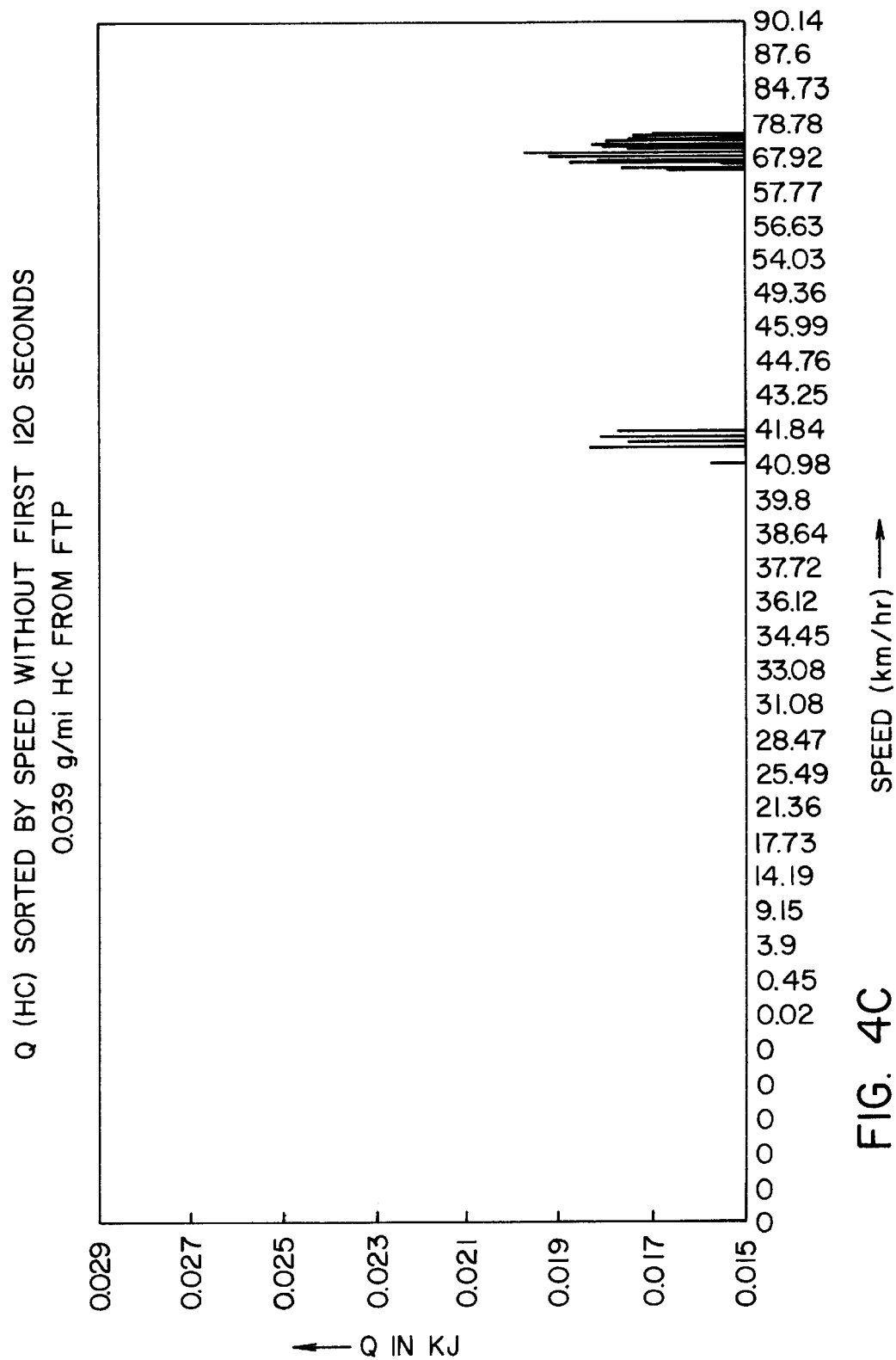
FIG. 4C is the graph of FIG. 3C replotted to exclude emission data below a fixed level.

FIGS. 4A and 4B contain few signals that exceed the threshold. However, FIG. 4C clearly shows a cluster of signals under these speed conditions that exceed the threshold. The percentage of such signals is 35%. Thus, only the catalyst sample depicted in FIG. 4C fails according to this evaluation.

This sampling algorithm is for illustration only. Full implementation of the invention requires significantly more complex sampling techniques than shown with this simple example. For example, it may be necessary to observe failure in three or four cells (each with its own threshold value) before catalyst failure is indicated. As explained below with reference to the drawings any number of sampling techniques can be employed to determine whether any specific histogram has been validly sampled in a sound, statistical manner. The use of diagnosing multiple cells leads to more accurate evaluation of catalyst performance.

In summary, FIGS. 3A, 3B, 3C and 4A, 4B, 4C disclose one of the underpinnings of the present invention in that actual emission data is taken simply at speed ranges stipulated in the FTP or other emission tests procedure, stored, read and sampled to indicate whether or not the vehicle's system meets regulatory standards. Actual hard data is used and that data is compared against specific standards. Should the vehicle be pulled from service and subjected to an FTP, the emissions sensed during testing will directly correlate to the monitored emissions recorded in the vehicle to that time. There is no comparison of emissions before and after the catalyst. There is no data bank of stored information based on emissions recorded from a typical or standard vehicle, or even from the vehicle itself when new, which is required in the artificial intelligence prior art discussed above. There is no differentiation or filtering leading to rejection of certain signals. All signals are simply recorded (but in a meaningful way as discussed later) and statistically evaluated.

Figure 5:
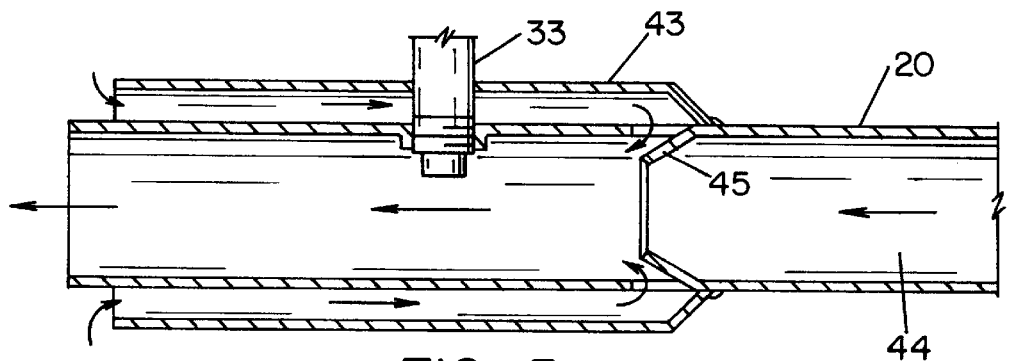
FIG. 5 is a diagrammatic partially sectioned view of the tailpipe of the vehicle fitted with a calorimetric sensor.

As noted above, the present invention does not require a specific hydrocarbon sensor 33. In the preferred embodiment a pellistor hydrocarbon sensor is sufficient. Reference can be had to U.S. Pat. Nos. 5,265,417 to Visser et al. and 5,451371 to Zanini-Fisher et al. for calorimetric hydrocarbon sensors and to U.S. Pat. No. 5,476,001 to Hoetzel et al. where an oxygen pump is used to condition the sampled exhaust gas to enhance sensitivity, all of which are incorporated herein by reference. Insofar as the present invention is concerned, it is theoretically preferred that hydrocarbon sensor 33 be positioned in tail pipe 20 adjacent tail pipe outlet and downstream of muffler 19. At this position, the exhaust gas temperature has dropped to its lowest temperature permitting more accurate readings of the calorimetric sensor while prolonging its life as noted above. Positioning hydrocarbon sensor 33 adjacent or close to the outlet of tail pipe 20 permits any number of baffling arrangements to be used to draw atmospheric air into the exhaust stream should the exhaust gas mixture be rich and need combustion air for accurate sensor readings. For example, as illustrated in the embodiment illustrated in FIG. 5, a recessed annular air duct 43 surrounding tail pipe 20 and communicating with the exhaust gas passageway 44 through baffles 45 can be provided. Exhaust gas leaving tail pipe 20 will, in effect, act as a pump and assist in creating an underpressure zone drawing atmospheric air through annular air duct 43 for mixing with the exhaust stream downstream of hydrocarbon sensor 33. Other arrangements will suggest themselves to those skilled in the art.

As discussed above, in practice and in the preferred embodiment hydrocarbon sensor 33 will be positioned in the exhaust portion of the casing for TWC 18. In this position, additional oxygen will be supplied to hydrocarbon sensor 33 through means of a conventional oxygen pump. Specifically, reference can be had to U.S. Pat. No. 3,505,837 to Friese et al., incorporated by reference herein, for a description of such an oxygen pump. Other oxygen pump arrangements will suggest themselves to those skilled in the art.

Finally, while the invention will work with a conventional pellistor sensor, the invention will also work for any of the "new" sensors which will inevitably be developed by the trade in response to stringent emission requirements. The invention is not limited to a pellistor sensor.

Figure 2:
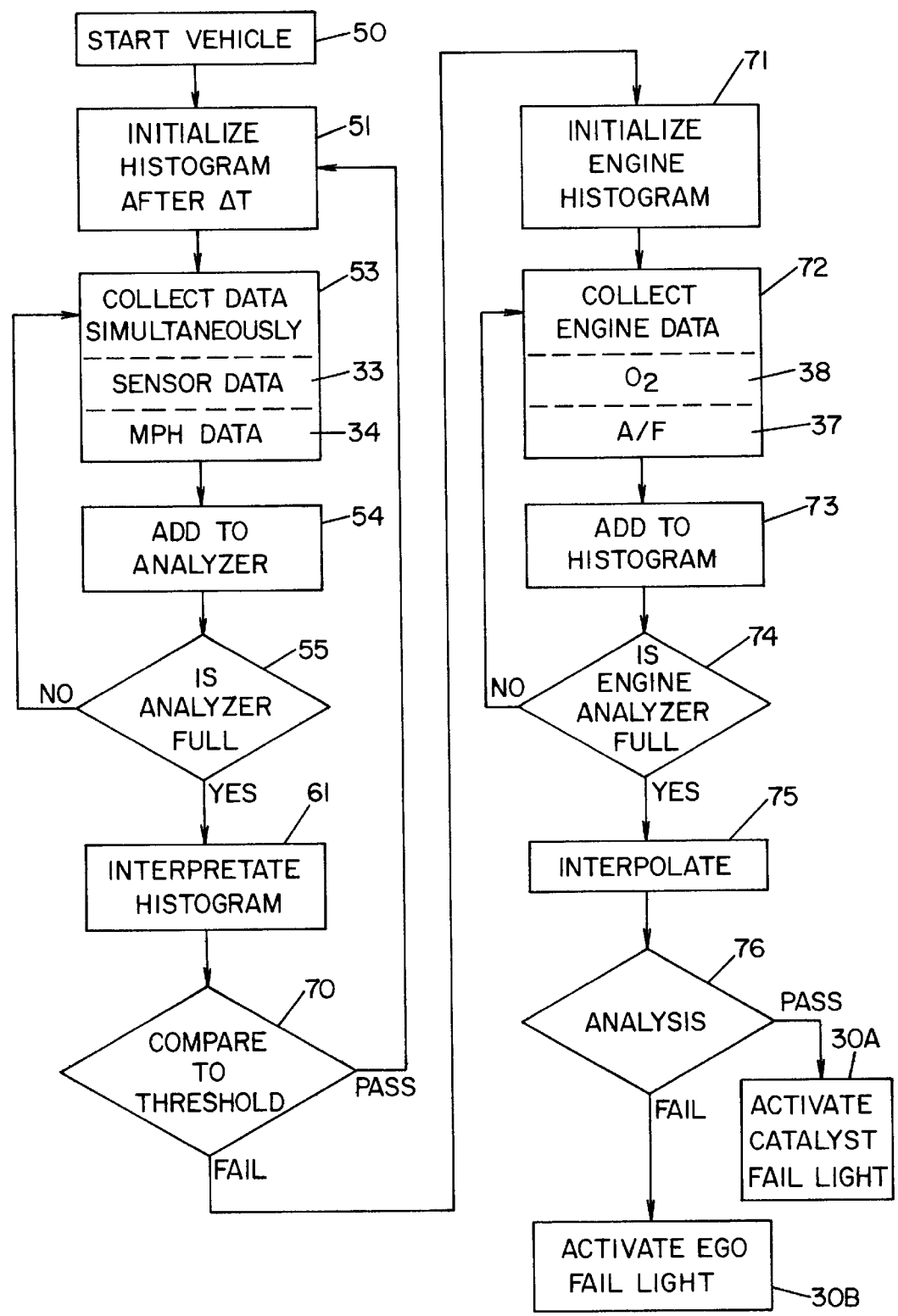
FIG. 2 is a general process flow chart of the monitoring system of the present invention.

Referring now to FIG. 2, there is illustrated a process flow diagram of the invention in its simplest form. The vehicle is started at block 50 and after a wait of about 120 seconds to insure that adverse readings attributed to a cold start of the engine are not taken, the histograms are initialized at block 51. The histograms of the present invention are constructed from software routines reading into memory in appropriate fields or channels sensor data which has been digitized. The histograms can be viewed as multi-channel analyzers with data stored in buffers correlated to specific channels of the multi-channel analyzer. For convenience, the term multi-channel analyzer will be used to describe the mechanism by which the histograms used in the present invention are built. The multi-channel analyzer or the buffers making up the analyzer are initialized or zeroed out at step 51. Emission data is collected on timed basis at step 53. In the preferred embodiment, the only data which needs to be collected is the emission data from hydrocarbon sensor 33 and the simultaneously sensed MPH data from speed sensor 34. This data is preferably collected at a frequency of one reading per second or one reading per half second although other sampling frequencies can be used. The sampled data is added to multi-channel analyzer in step 54 and the analyzer is checked in step 55 to determine if it is full.

Figure 6:
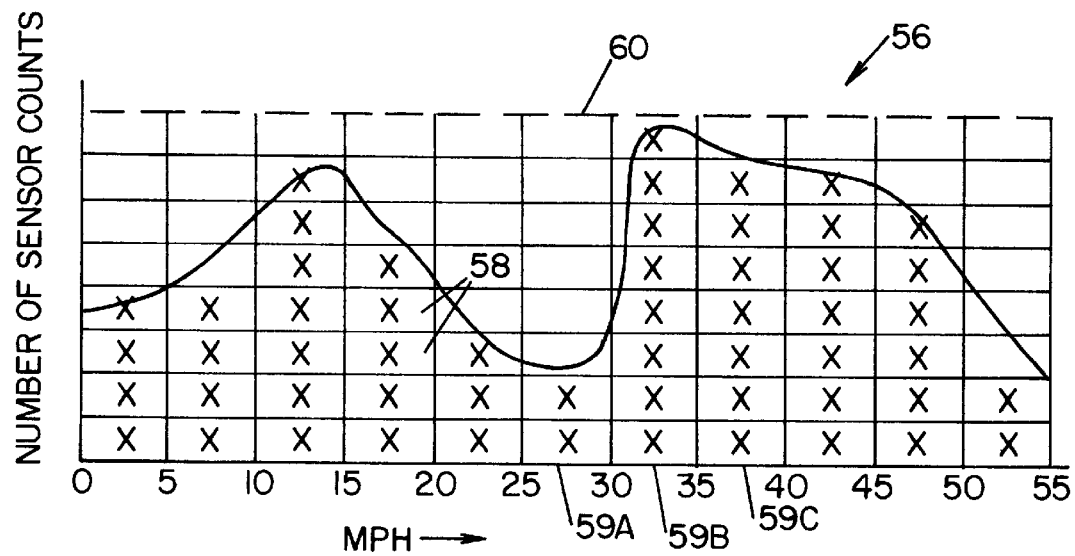
FIG. 6 is a plot of data indicative of a memory function employed in the invention.

Steps 54 and 55 may perhaps be best illustrated by reference to FIG. 6 which diagrammatically illustrates the multi-channel analyzer. Each hydrocarbon sensor signal 33 is a count having a definitive value and is stored as a count 58 in multi-channel analyzer 56. Each channel 59, shown on the x-axis in FIG. 6, represents a speed or a speed range and for discussion purposes, each channel is divided into 5 MPH ranges so that, for example, channel 59A would cover vehicle speeds from 25–30 MPH and channel 59B would cover vehicle speeds from 30–35 MPH and channel 59C would cover vehicle speeds from 35–40 MPH. Of course, in practice, the memory is virtual and the reason for selecting speed ranges into which the data is sorted is simply to assure a sufficient number of counts to build a histogram for each channel. Further, the channel range does not have to be linear. When a preset number of events or counts have been recorded in a given channel indicted by line 60 in FIG. 6, the channel is full. When a preset number of channels have reached the full status, the data in multi-channel analyzer 56 is read out for interpretation at step 61 (shown in FIG. 2). Typically, 80–90% of the channels 59 in analyzer 56 have to be full before the data is read out and a LIFO (last in, first out) system is used to maintain the data current while analyzer 56 builds a sufficient data base to accomplish a viable statistical analysis.

Figure 7:
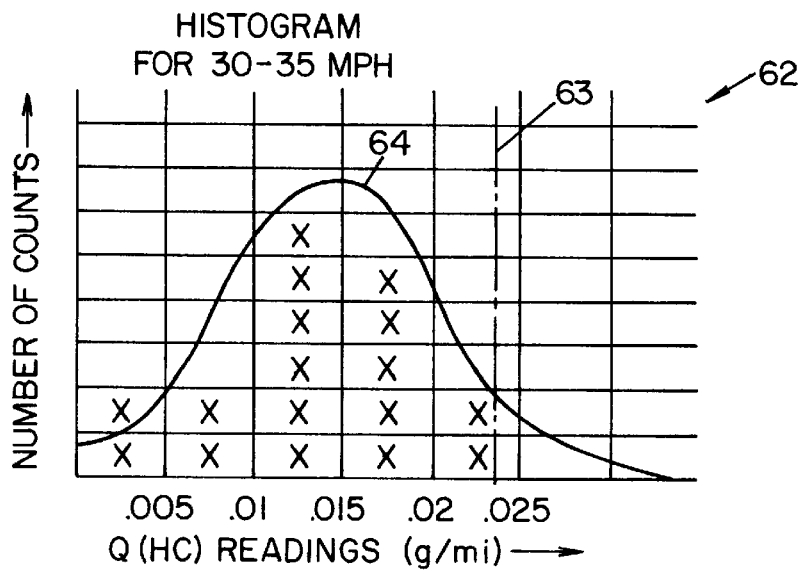
FIG. 7 is a histogram constructed from the data plotted in FIG. 6.

Step 61 in FIG. 2 is perhaps best explained by reference to FIG. 7. That is, when analyzer 56 is full, a histogram is constructed for each channel in analyzer 56. FIG. 7 diagrammatically shows then a multi-channel analyzer for hydrocarbon sensor data 33 stored in channel 59B of analyzer 56 representing the emission signals generated when the vehicle was traveling 30–35 MPH. In practice, analyzer 56 does not exist (except in function) and is shown only to describe how the database is built. ECM 15 will first read the mph data from speed sensor signal 34 to determine which analyzer (59A, 59B, 59C, etc.) the corresponding hydrocarbon sensor signal 33 will be stored in and ECM 15 will then store hydrocarbon sensor signal 33 as a count in analyzer 62. The sensor signals are correlated to HC and CO emissions and are stored in specific analyzer 62 at ranges indicative of increasing emissions. For consistency with the graphs illustrated in FIGS. 3A, 3B, 3C and FIGS. 4A, 4B, 4C, the sensor data is plotted on the x-axis as Q (heat transfer) corresponding to the temperature readings sensed by hydrocarbon sensors 33. According to the FTP, emissions produced by the vehicle at the speeds 30–35 MPH cannot exceed a threshold value indicated by dot-dash line 63 in FIG. 7. Threshold limit 63 is stored in look-up tables 27 and can be varied to meet whatever regulatory standards are set by any governmental agency. In accordance with the invention, any sampling technique can be employed to sample the sensor data stored in any specific analyzer 62 to determine whether or not the vehicle met the threshold standard for that vehicle speed. Thus, the invention contemplates that in addition to relatively simply sampling techniques which discard a top and bottom percentage range of data and sums and averages the remaining data, an actual histogram curve 64 can be fitted to the data. Any known sampling technique can then be performed to analyze curve 64. For example, curve 64 can be integrated to determine areas under the curve beyond threshold limits for acceptance/rejection decision. In accordance with the invention, a sufficient volume of data has been collected to generate a histogram curve 64 which can statistically account for deviations in sensor readings and the like which inherently render any scheme directly monitoring the tail pipe emissions sporadic. In accordance with a more subtle aspect of the invention only a minimal amount of data directly corresponding to the parameters of the FTP are collected, but significantly all the data collected is used. Emission sensor signals are not discarded.

Referring again to FIG. 2, whether or not the emission system of the vehicle passed or failed emission standards depends on the number of histogram curves 64 which passed or failed the test. This, in turn, depends on the compliance standards set in the FTP which is stored in the look-up tables 29. If the analysis of histogram curves 64 at step 70 show that the vehicle emission system passed, then multi-channel analyzers 56, 62 are initialized to reset and the process starts over since a failure has not occurred. That is, there is no reason to check any of the components of the system since the vehicle has met the FTP. In the event of failure however, the system undergoes a further fault-finding diagnostic routine to pinpoint what component of the emission system has failed. Again, the diagnostic routine only is actuated when an overall failure of a system has occurred at step 70.

The diagnostic analysis portion of the engine proceeds in the same fashion as that previously described for steps 50–70, however, emission data and mph data is not used. At step 71, an initiation of an operating condition multi-channel analyzer is made. At step 72, operating condition sensor data is collected. Operating condition sensor data could include any number of the sensor data described with reference to FIG. 1. In the preferred embodiment, air/fuel ratio sensor signals 37 and EGO oxygen sensor reading signals 38 are collected. Optionally, and unlike the emission test, in the fault finding diagnostic routine of the invention, filtering is a beneficial, useful tool. Thus, the air/fuel sensor signals 37 could have a filter so that only on data collected in lean and stoichiometric operating modes are collected.

Again, the memory database is compiled for fault-finding diagnostic routine in the same manner as the routine used to determine an emissions failure. The oxygen and air/fuel signals are stored in step 73 until the analyzer is full as indicated at step 74. The multi-channel analyzer or memory initially sort the oxygen sensor readings for given ranges of air/fuel ratios, each range comprising a multi-channel analyzer. For each air/fuel ratio "channel" or multi-channel analyzer, a histogram curve of associated EGO readings for the specific range of A/F ratios is constructed and compared to stored threshold levels at step 75. If the EGO sensor signals 38 fall within the threshold limits, then failure of the TWC catalyst 18 has occurred and this is indicated by triggering an additional TWC display failure light 30A. If the decision analysis in step 76 of the histograms interpolated in step 75 indicated that the exhaust emissions at the EGO sensors 38 exceeded the threshold limits, then engine emission failure light 30B is activated. Alternatively, only one failure light 30 is activated and the specific failure is stored, conventionally, as a code in memory.

Those skilled in the art will recognize that the invention as described thus far in FIG. 2 has determined whether or not the failure in the vehicle emission system is attributed positively to a failure in TWC 18 or to some failure in the system upstream of TWC 18. There are several emission systems for engine 12 and the fault-finding diagnostic routine can continue to sequentially analyze each engine system, i.e., exhaust gas recirculation, in turn, until that system which resulted in failure of the vehicle at step 70 to meet the regulatory standards has been positively identified. The invention has been described only in determining whether TWC 18 caused the failure.

Figure 8:
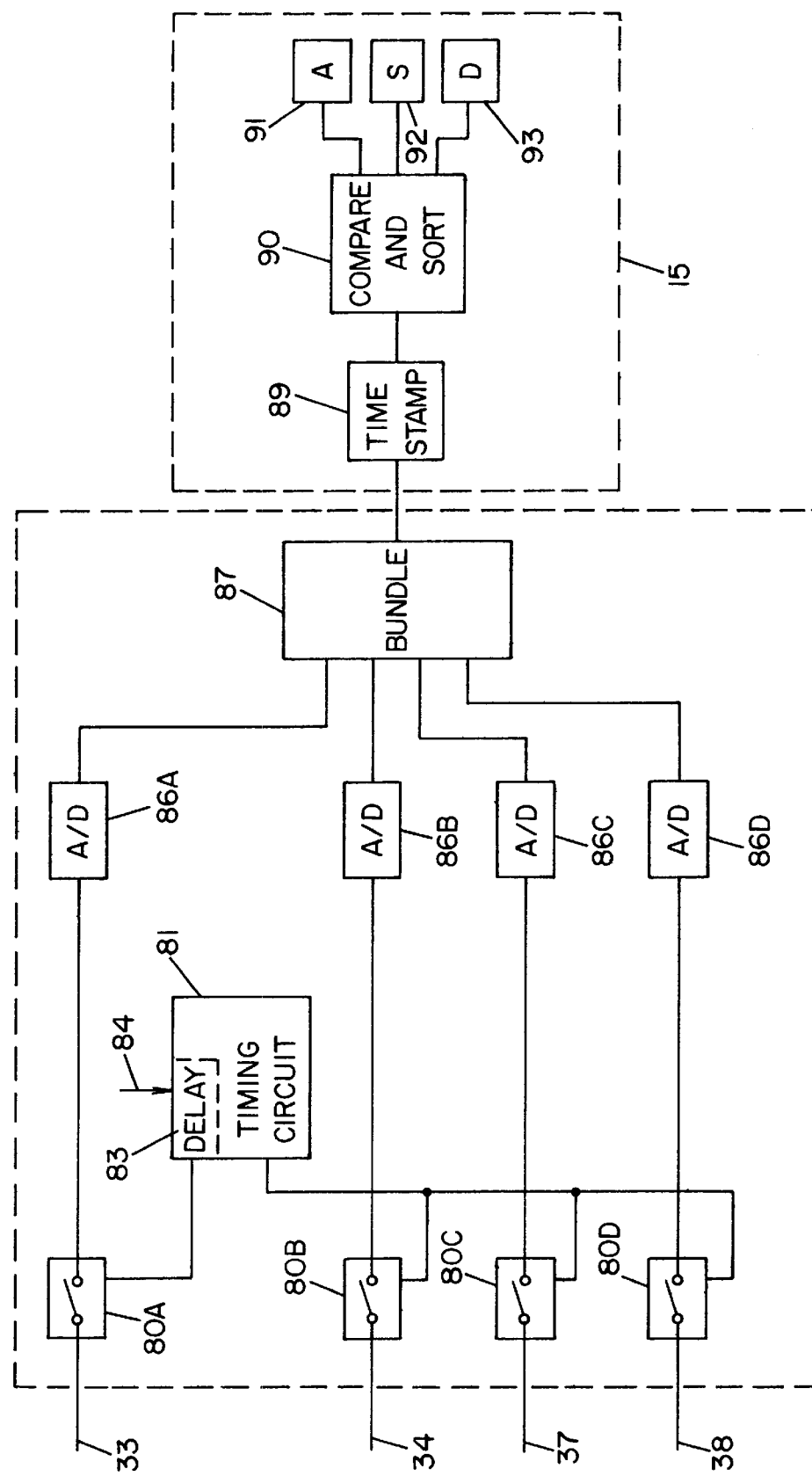
FIG. 8 is a schematic, diagram of the control of an alternative embodiment of the invention shown in block form.

Referring now to FIG. 8 there is diagrammatically illustrated in a general sense one type of system with some alternative modifications which could be utilized to implement the present invention although other arrangements will suggest themselves to those skilled in the art. The sensor devices generate analogue signals and the signals are read at any given time by conventional switching devices indicated by block 80, specifically, block 80A switching on and off hydrocarbon sensor signal 33, block 80B switching on and off speed sensor signal 34, block 80C switching on and off A/F ratio sensor signal 37 and block 80D switching on and off EGO sensor signal 38. Additional operative sensor signals can be included. Switching devices 80, in turn, are actuated by a conventional timing or clock circuit 81. As noted above, in the preferred embodiment, timing circuit 81 sets switching devices 80 to cycle on/off at intervals of about 1 second to about ½second, i.e., switching devices 80 are normally open and momentarily closed at ½to 1 second intervals. In the preferred embodiment, all the signals are simultaneously collected. In practice, it is known that there is a time lag from the instant that internal combustion engine 12 produces the exhaust gas to the instant when the exhaust gas is sensed by hydrocarbon sensor 33. In accordance with the preferred embodiment, whatever inconsistency is attributed to the time lag, that inconsistency is nulled by that large database of readings collected. Secondly, the basic system of the invention simply analyzes the end result. It does not compare gas analysis taken before and after the TWC 18 in which gas flow and kinetic reactions produced by the catalyst could seriously distort readings attempting to demonstrate catalytic efficiencies. Thus, the error, if any, in the preferred embodiment of the present invention would be that the speed of the vehicle might have slightly changed during the fraction of the second it took the exhaust gas to travel from the engine to the sensor. Again, over time, whatever the change may be, the changes would cancel each other out as the data is collected and still further, when the vehicle is subjected to regulatory testing, the time lag is present in any event. Should the regulations change, or tighten so that a time correlation between sensor readings is required for whatever reason, a time delay indicated schematically at 83 in timing circuit 81 could be optionally employed. Time delay 83 would be software controlled as indicated by reference numeral 84. For example, exhaust speed sensor 40 could be continuously monitored to set the software status signal 84 which, in turn, would delay switching device 80A for a time period indicative of the time it takes for the exhaust gas to travel to hydrocarbon sensor 33. Hydrocarbon Sensor 33 would then read the hydrocarbon content of the exhaust gas produced at the very instant that vehicle speed signal recorded the vehicle's speed. Since the readings have taken over relatively long time periods, a sufficient delay time is inherently provided for time delay 83 to work.

Each analog signal is then digitized in an analog to digital converter 86 there being shown four such converters (86A, 86B, 86C, and 86D) for the four sensor signals shown in FIG. 8. The signals are then sent to a microprocessor 87 which bundles, groups, or clusters all the signals into a data packet. Any number of techniques can be used to bundle the signals. They can be serially linked or bit addresses for each signal in the group can be tied to a common signal generated by microprocessor 87. All of the functions described thus far could be performed within ECM 15, but in the FIG. 8 embodiment, a separate microprocessor contained within external analyzer 32 is provided. Further, in accordance with the alternative embodiment shown in FIG. 8, those skilled in the art will recognize that this embodiment differs from the flow process chart illustrated in FIG. 2 in that the operative conditions set by the vehicle are being collected at the same time as the emission signals of the vehicle are being collected. Should a failure in the emission systems be discovered at step 70, the monitoring system has the data in the bundled data packet which occurred at the time or during the time that the emission system went awry to conduct further diagnostic testing. New data does not have to be obtained.

Each bundle or data packet is then time stamped by a time stamp routine at 89. Preferably a time stamp digitized number is simply assigned each data packet. This could be as simple as a zero or one to provide merely a distinction between the first data packet produced in time from the immediately succeeding and second data packet or the time stamp could be more sophisticated and provide an indiction of the vehicle age. The process then compares the earlier generated packet data with the packet data immediately generated in the next time interval in a compare and sort routine designated at block 90. More specifically, the sensor signals are generated vis-a-vis time circuit 81 at fixed intervals and time stamp block 89 provides a means for differentiating one packet of signals from another at a fixed time interval. Thus, compare and sort routine 90 by means of a simple algorithm can read vehicle speed sensor data generated from vehicle speed sensor 34 to determine if the vehicle speed during the one second or one-half second interval increased, decreased or stayed constant (and by how much). The differentiated data packets are then sorted into separate analyzers, for example an accelerating analyzer 91, steady state or constant speed analyzer 92, or a decelerating analyzer 93. Appropriate histograms are then developed specifically matched to the FTP. It is, of course, appreciated that the comparison can be made over a time range encompassed by several signal data packets instead of two. It is also to be recognized that the multi-channel analyzers 91, 92, 93 illustrate separate memory devices only for the purposes of explanation, it being understood and recognized that the memories may be contained by a single memory having separately addressable set of correction factors or any other conventional storage and retrieval expedient.

Thus, in the embodiment illustrated in FIG. 8 a final division of emission data can be collected precisely corresponding to whatever conditions are specified for the vehicle to meet by any emission test. Still further, those skilled in the art will recognize that because the sensor signals have been correlated to one another on a time basis and have been bundled together, it is possible for ECM 15 to perform any number of sorting routines to provide diagnostic analysis which could be of benefit either in the operation of the vehicle or in the maintenance of the vehicle for other than emission purpose.

It is also to be appreciated that since the emission system of the present invention is continuously conducting evaluations based on the vehicle's ability at the time to meet emission standards, it is possible to simply collect data from passed tests which also can be stored before initializing the analyzers which in turn can function to predict a failure of the emission system. Thus, in accordance with the present invention, it is not only possible to alert the operator when the failure has occurred, but also to prediction when failure will occur. Maintenance of the vehicle can be scheduled accordingly.

Not shown in the process flow sheet or discussed above is any mechanism for testing hydrocarbon sensor 33. In the preferred embodiment, hydrocarbon sensor 33 is a calorimetric sensor. Increased temperatures attributed to combustion of hydrocarbons and CO result in different signals produced by the calorimetric sensor. In accordance with the invention, hydrocarbon sensor 33 is periodically tested when the vehicle is not operating. An electrical resistance heater will provide heat from the battery to one of the sensors and the sensor's readings compared to an expected value. Failure of the sensor to exhibit the expected response will in turn indicate a failure to the operator requiring replacement of hydrocarbon sensor 33. Although not verified by testing, it is further contemplated that varying an electrical current through the sensor could produce a basis for the expected sensor responses. Reference can be had to U.S. Pat. No. 5,137,616 to Poor et al. for a somewhat similar concept.

The invention has been described with reference to a preferred embodiment. Modifications and alterations will suggest themselves to those skilled in the art upon reading and understanding the description of the invention as set forth above. It is intended to include all such modifications and alterations insofar as they come within the scope of the present invention.

Having thus defined the invention, it is claimed:

1. An on-board vehicular catalytic converter monitoring system for determining failure of a vehicle to meet emission regulatory standards comprising:
    a) an emission sensor downstream of the catalytic converter generating emission signals during vehicle operation indicative of the gaseous pollutants produced by said vehicle's internal combustion engine;
    b) at least one operative sensor on the vehicle generating operating signals indicative of an operating condition experienced by said vehicle during its operation; and
    c) computer means with memory for simultaneously processing said emission signals and said operating signals to determine when and if said emission signals have exceeded regulatory standards, said computer means including:
        i) matching means for matching each emission signal with an operating signal;
        ii) storing means for storing each emission signal in memory to build a plurality of histograms of emission signals, each histogram correlated to a range of values of an operating condition sensed by said operative sensor such that any given emission signal is stored in a given histogram corresponding to the range of values of said operating signal matched to said given emission signal;
        iii) sampling means activated when a set number of emission signals have been stored in said histograms for factoring said emission signals in each histogram to determine a factored emission state of said vehicle at given vehicle operating conditions indicative of the actual pollutants emitted by said vehicle;
        iv) comparing means for comparing only said factored emission state to a stored threshold emission level corresponding to a regulatory emission standard for a given vehicle operating condition; and
    d) fault indicating means in said vehicle activated to alert the vehicle operator of an emission failure when said comparing means has sensed a factored emission state exceeding said threshold level for said operating condition for a preset number of histograms.

2. The system of claim 1 further including a plurality of second operative sensors, each second operative sensor generating operative signals during vehicle operation indicative of an operating condition of the vehicle's internal combustion engine producing gaseous pollutants; said storing means further including means to associate said plurality of second operative signals with a simultaneously generated emission signal; and sort means effective when said fault indicating means has been activated to match two or more operative signals associated with a common emission system, said storing means effective to build a plurality of histograms from said matched operative signals to determine from said operative signals what component of said vehicle has caused activation of said fault indicating means.

3. The system of claim 2 wherein said emission sensor is a hydrocarbon sensor and said operative sensor signals are indicative of the speed of the vehicle.

4. The system of claim 3 wherein said operative sensor signals are indicative of the engine speed, engine load and the pollutants produced by said vehicle's engine upstream of said catalytic converter.

5. The system of claim 2 wherein said sensors generate analog signals, said system further including analog to digital means for digitizing said emission and said operative signals, means to match and bundle any given plurality of operative signals simultaneously generated with a given emission signal to generate a composite signal, said storage means effective to generate a histogram for any given operative signal and to sample said histogram to determine if said given operative signals stored in said histogram exceed a set threshold level.

6. The system of claim 5 further including said fault indicating means effective to identify a failure of a specific vehicular component depending on any given factored operative signal exceeding a set threshold.

7. The system of claim 6 wherein said means to match and bundle said emission signal and said operative signal includes time stamping each bundled signal, filtering means for comparing, on a timed basis, operative signals in said bundles corresponding to vehicle speed and said storing means effective to build a first histogram of bundled signals of generally constant speed signals and a second histogram of bundled signals in which the speed of the vehicle varies over a set range.

8. The system of claim 2 further including means to check said emission sensor when said internal combustion engine is not running to assure its accuracy.

9. The system of claim 1 wherein said emission sensor is a hydrocarbon sensor.

10. The system of claim 9 wherein said hydrocarbon sensor is a pellistor sensor.

11. The system of claim 1 wherein said sampling means factors said emission signals stored in any given histogram by discarding a set percentage of emission signals indicative of the highest and lowest levels of pollutants sensed by said emission sensor and averaging the remainder of said emission signals to produce a factored emission state indicative of the concentration of pollutants produced by the vehicle's internal combustion engine.

12. The system of claim 11 wherein said sampling means samples said histograms only when a set number of adjacent channels in each histogram reach a set number of emission signals stored therein.

13. The system of claim 12 wherein said comparing means compares each histogram's factored emission state with a stored regulatory threshold value for each histogram and said fault indicating means is activated when said thresholds for a set percentage of said histograms are exceeded.

14. A method for on-board monitoring of the gaseous pollutant emissions produced by a computer controlled internal combustion engine of a vehicle, said method comprising the steps of:
   a) producing emission signals only from an emission sensor downstream of the vehicle's catalytic converter;
   b) producing at least a first vehicle operative condition signal used by said computer to control the operation of said vehicle's internal combustion engine;
   c) matching and storing simultaneously generated operative condition signals and emission signals in a plurality of histograms under the control of said computer, each histogram corresponding to a range of values sensed by said operative condition sensor and each emission signal stored in a histogram corresponding to a specific range of operative condition signals determined by the value of said operative condition signal sensed when said emission signal was generated;
   d) sampling each histogram once a set number of emission signals have been stored therein by factoring said emission signals in each histogram to determine a statistically validated emission level for each range of sensed operative conditions;
   e) comparing each validated emission level with a regulatory threshold emission value corresponding to said operative condition range; and
   f) activating a fault detecting alarm in the vehicle when a set number of validated emission levels exceed their corresponding threshold emission level.

15. The method of claim 14 further including in step (b) collecting at least a plurality of second operative condition sensor signals and matching each of said second plurality of operative condition sensors with a given emission signal, and further including the step, after said emission signals have been statistically determined in step (e) to exceed the threshold value, of building and sampling histograms of said first and second operative condition matched sensors signals to ascertain which vehicle component caused said sensed emission signals to exceed the regulatory threshold value.

16. The method of claim 15 wherein said first operative condition includes the speed of said vehicle, and each histogram corresponds to a vehicular speed range.

17. The method of claim 15 wherein said second operative conditions include the oxygen content of the exhaust gas upstream of said vehicle's catalytic converter and the air/fuel ratio supplied said vehicle as determined by said vehicle's computer, said computer generating air/fuel ratios as a result of vehicle sensor signals received by said computer, said storing step (c) further including storing said oxygen content signals of said exhaust gas in additional histograms at set ranges of said air/fuel ratios, the range determined by the matched air/fuel ratio signal generated simultaneously with said oxygen content signal and step (g) further includes factoring said oxygen content signals subsequently compared to a stored operating condition threshold value to determine if said catalytic converter has caused said failure.

18. The method of claim 14 further including the step of digitizing and bundling said emission and said operative condition signals so that a digitized bundled set of signals are stored in memory, and sampling said operating condition signals when a failure detected by said emission signal has occurred to isolate that vehicular component which has caused said emission failure.

19. The method of claim 18 wherein the histograms correlate emissions to vehicular speed ranges; said method further including the step of filtering said bundled signals on a timed basis to distinguish bundled signals generated under acceleration/deceleration and steady state speed signals and said matching, and storing step including storing emission signals determined in said filtering step to be steady state speed signals in a first set of histograms and emission signals determined in said filtering step to be acceleration/deceleration signals in a second set of histograms.

20. The method of claim 14 wherein the histograms correlate emissions to vehicular speed ranges; said method further including the step of filtering said bundled signals on a timed basis to distinguish bundled signals generated under acceleration/deceleration and steady state speed signals and said matching, and storing step including storing emission signals determined in said filtering step to be steady state speed signals in a first set of histograms and emission signals determined in said filtering step to be acceleration/deceleration signals in a second set of histograms.

21. An on-board vehicular catalytic converter monitoring system for determining failure of a vehicle to meet emission regulatory standards comprising:
   a) a hydrocarbon sensor downstream of the catalytic converter generating emission signals during vehicle operation indicative of the gaseous pollutants produced by said vehicle's internal combustion engine;
   b) a speed sensor on the vehicle generating operating speed signals indicative of the speed of said vehicle during its operation; and
   c) computer means with memory for simultaneously processing said emission signals and said speed signals to determine when and if said emission signals have exceeded regulatory standards, said computer means including:
      i) matching means for matching each emission signal with a simultaneously generated speed signal;
      ii) storing means for storing each emission signal in memory to build a plurality of histograms of emission signals, each histogram correlated to a range of speed values such that any given emission signal is stored in a given histogram corresponding to a speed range determined by said speed signal simultaneously generated and matched with any given emission signal;

iii) sampling means activated when a set number of emission signals have been stored in said histograms for factoring said emission signals in each histogram to determine a factored emission state of said vehicle at given vehicle speeds indicative of the actual pollutants emitted by said vehicle;

iv) comparing means for comparing only said factored emission state to a stored threshold emission level corresponding to a regulatory emission standard for any given vehicle speed; and d) fault indicating means in said vehicle activated to alert the vehicle operator of an emission failure when said comparing means has sensed a factored emission state exceeding said threshold level for a preset number of histograms.

22. The system of claim 21 wherein said sensors generate analog signals, said system further including analog to digital means for digitizing said emission and said speed signals, means to match and bundle any given speed signal with a simultaneously generated emission signal to generate a composite signal, said storage means effective to generate a histogram of emission signals for any given speed signal and to sample said histogram to determine if said emission signals stored in any given histogram exceeds a set threshold level.

23. The system of claim 22 wherein said means to match and bundle said emission signal and said speed signal includes time stamping each bundled signal, filtering means for comparing, on a timed basis, speed signals in said bundles to determine if said vehicle's speed is constant, accelerating or decelerating and said storing means effective to build a first histogram of bundled signals of generally constant speed signals and a second histogram of bundled signals in which the speed of the vehicle varies over a set range.

24. The system of claim 23 wherein said sampling means factors said emission signals stored in any given histogram by discarding a set percentage of emission signals indicative of the highest and lowest levels of pollutants sensed by said emission sensor and averaging the remainder of said emission signals to produce a factored emission state indicative of the concentration of pollutants produced by the vehicle's internal combustion engine.

25. The system of claim 21 wherein said sampling means factors said emission signals stored in any given histogram by discarding a set percentage of emission signals indicative of the highest and lowest levels of pollutants sensed by said emission sensor and averaging the remainder of said emission signals to produce a factored emission state indicative of the concentration of pollutants produced by the vehicle's internal combustion engine.

26. The system of claim 21 further including a plurality of second operative sensors, each second operative sensor generating operative signals during vehicle operation indicative of an operating condition of the vehicle's internal combustion engine producing gaseous pollutants; said storing means further including means to associate said plurality of second operative signals with a simultaneously generated emission signal; and sort means effective when said fault indicating means has been activated to match two or more operative signals associated with a common emission signal, said storing means effective to build a plurality of histograms from said matched operative signals to determine from said operative signals what component of said vehicle has caused activation of said fault indicating means.

* * * * *